United States Patent
Muddu et al.

(10) Patent No.: US 9,189,589 B2
(45) Date of Patent: Nov. 17, 2015

(54) PATTERN-BASED VIA REDUNDANCY INSERTION

(71) Applicant: GLOBALFOUNDRIES Inc., Grand Cayman (KY)

(72) Inventors: Swamy Muddu, Milpitas, CA (US); Shangliang Jiang, Albany, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 44 days.

(21) Appl. No.: 14/132,926

(22) Filed: Dec. 18, 2013

(65) Prior Publication Data
US 2015/0169818 A1   Jun. 18, 2015

(51) Int. Cl.
*G06F 17/50* (2006.01)

(52) U.S. Cl.
CPC ........ *G06F 17/5081* (2013.01); *G06F 2217/12* (2013.01)

(58) Field of Classification Search
None
See application file for complete search history.

(56) References Cited

U.S. PATENT DOCUMENTS

| | | | | |
|---|---|---|---|---|
| 6,941,528 | B2* | 9/2005 | Allen et al. | 716/122 |
| 7,290,226 | B2* | 10/2007 | Correale et al. | 716/113 |
| 7,340,710 | B1* | 3/2008 | Hoerold et al. | 716/113 |
| 7,665,052 | B1* | 2/2010 | Serdar et al. | 716/113 |
| 7,689,960 | B2* | 3/2010 | Park et al. | 716/119 |
| 2006/0064653 | A1* | 3/2006 | Zhang et al. | 716/2 |

* cited by examiner

*Primary Examiner* — Leigh Garbowski
(74) *Attorney, Agent, or Firm* — Wayne F. Reinke, Esq.; Heslin Rothenberg Farley & Mesiti P.C.

(57) ABSTRACT

Via redundancy insertion is described. A via layout is analyzed by identifying each via, and for each via, identifying a location therefore in the layout, whether the via is redundant and a layout configuration for the via. Each via is classified into a bin of similar layout configurations. For each bin of redundant vias, possible via replacement candidates are determined from a database of possible replacement vias, and the candidates are ranked according to rule-based, recommendation-based and/or model-based criteria. For each via in each bin having a replacement(s), an optimal replacement is identified from among the ranked candidates taken in ranked order that first satisfies another criteria, such as not violating an applicable design rule. The layout is then updated with the optimal replacement.

20 Claims, 5 Drawing Sheets

PATTERN-BASED VIA REDUNDANCY INSERTION

BACKGROUND OF THE INVENTION

1. Technical Field

The present invention generally relates to semiconductor layout design. More particularly, the present invention relates to pattern-based via redundancy insertion.

2. Background Information

With the ever decreasing size of semiconductors, wiring and wiring design becomes more and more complex, and manufacturing yields become increasingly challenging. To electrically connect various layers and/or devices (e.g., between transistors), vias are strategically placed. As one skilled in the art will know, the term VIA means Vertical Interconnect Access between wiring layers in semiconductor devices. VIAs are also sometimes referred to as "cuts." Due to the importance of VIAs, and typical yield reductions as sizes decrease, it has become necessary to build in redundant VIAs, in case a given one becomes a casualty to the complex semiconductor manufacturing process. The process of designing redundant VIAs is known as Via Redundancy Insertion (VRI).

VRI is done both at the design phase, as well as post-design prior to manufacturing, and is typically driven by the analysis of design rules surrounding a given via in an existing layout. The analysis is performed with computer assistance, including, for example, Design Rule Check (DRC) engines. VIAs initially not redundant may be replaced with redundant VIAs by analysis of replacement candidates using one or more DRC engines. As the number of design rules increases with each reduction in size, the computations that must be performed by the DRC engines itself becomes a factor in VRI.

Therefore, a need continues to exist for improved VRI techniques.

SUMMARY OF THE INVENTION

The shortcomings of the prior art are overcome and additional advantages are provided through the provision, in one aspect, of a pattern-based method of via redundancy insertion. The method includes analyzing a via layout, the analyzing including identifying each via in the via layout, and, for each via, identifying a location therefor in the layout, whether the via is redundant and a layout configuration therefor, the layout configuration being based on a predetermined area surrounding the via. The analyzing further includes classifying the vias into a plurality of bins based on layout configuration. The method also includes, for each bin of redundant vias, determining possible via replacement candidates, and ranking the candidates according to one or more first criteria. The method further includes, for each via in each bin having at least one via replacement candidate, identifying an optimal replacement from among the ranked candidates taken in ranked order that first satisfies one or more second criteria, and for each via in each bin with an identified optimal replacement, updating the via layout.

In accordance with another aspect, a computer system is provided. The computer system includes a memory, and at least one processor in communication with the memory to perform a method for assisting with pattern-based via redundancy insertion. The method includes analyzing a via layout, the analyzing including identifying each via in the via layout, and for each via, identifying a location therefor in the layout, whether the via is redundant and a layout configuration therefor, the layout configuration being based on a predetermined area surrounding the via. The analyzing also includes classifying the vias into a plurality of bins based on layout configuration. The method further includes, for each bin of redundant vias, determining possible via replacement candidates, and ranking the candidates according to one or more first criteria. The method also includes, for each via in each bin having at least one via replacement candidate, identifying an optimal replacement from among the ranked candidates taken in ranked order that first satisfies one or more second criteria, and, for each via in each bin with an identified optimal replacement, updating the via layout.

In accordance with yet another aspect, a computer program product is provided. The computer program product includes a storage medium readable by a processor and storing instructions for execution by the processor for performing a method for assisting with pattern-based via redundancy insertion. The method includes analyzing a via layout, the analyzing including identifying each via in the via layout, and, for each via, identifying a location therefor in the layout, whether the via is redundant and a layout configuration therefor, the layout configuration being based on a predetermined area surrounding the via. The analyzing further includes classifying the vias into a plurality of bins based on layout configuration. The method also includes, for each bin of redundant vias, determining possible via replacement candidates, and ranking the candidates according to one or more first criteria. The method further includes for each via in each bin having at least one via replacement candidate, identifying an optimal replacement from among the ranked candidates taken in ranked order that first satisfies one or more second criteria, and, for each via in each bin with an identified optimal replacement, updating the via layout.

Additional features and advantages of this invention will become apparent from the following detailed description of the various aspects of the invention taken in conjunction with the accompanying drawings.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

As used herein, the term "connected," when used to refer to two physical elements, means a direct connection between the two physical elements. The term "coupled," however, can mean a direct connection or a connection through one or more intermediary elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable storage medium(s) having computer readable program code embodied thereon.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 1:
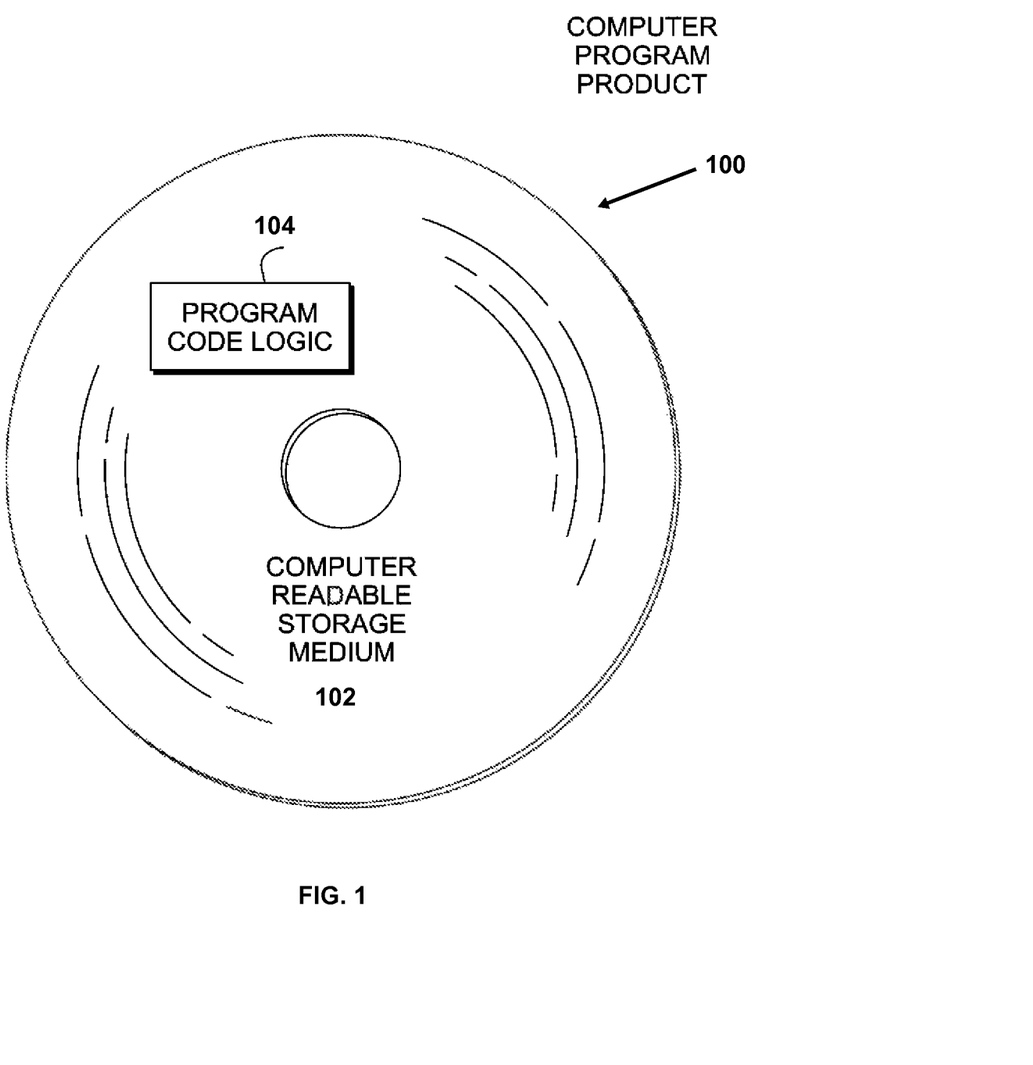
FIG. 1 depicts one example of a computer program product according to one or more aspects of the present invention.

Referring now to FIG. 1, in one example, a computer program product 100 includes, for instance, one or more non-transitory computer readable storage media 102 to store computer readable program code means or logic 104 thereon to provide and facilitate one or more aspects of the present invention.

Program code embodied on a computer readable storage medium may be transmitted using an appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Figure 2:
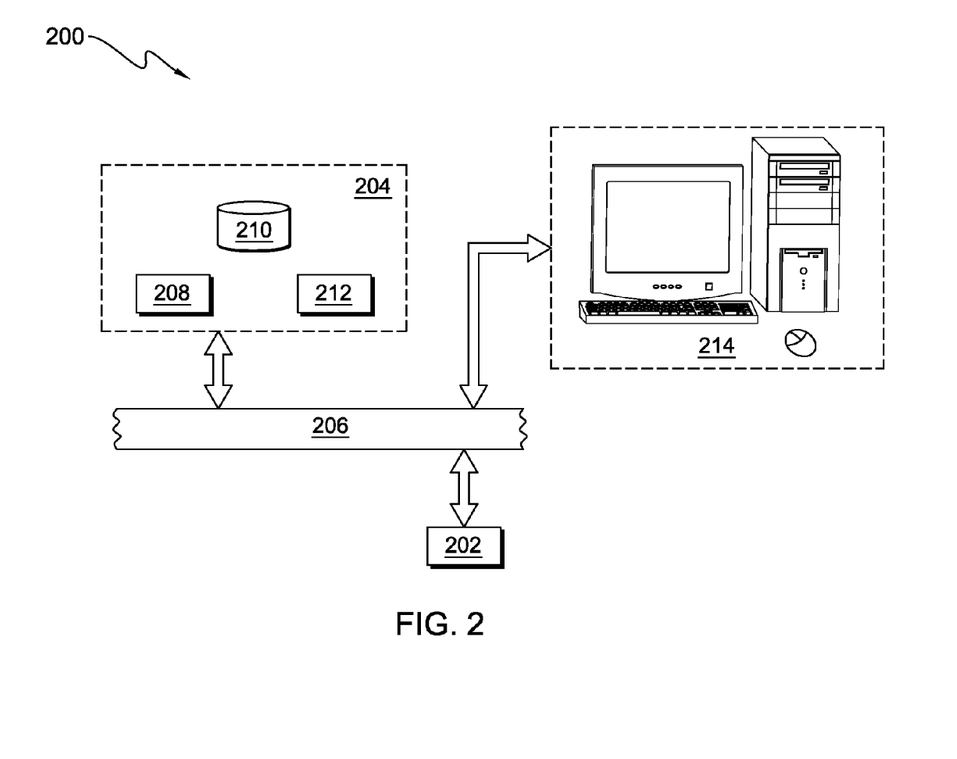
FIG. 2 is a simplified block diagram of one example of a computer system according to one or more aspects of the present invention.

FIG. 2 depicts one general block-diagram example of a data processing or computer system 200 suitable for storing and/or executing program code that includes at least one processor 202 coupled directly or indirectly to memory elements 204 through a system bus 206. The memory elements include, for instance, local memory 208 employed during actual execution of the program code, bulk storage 210, and cache memory 212 which provides temporary storage of at least some program code in order to reduce the number of times code must be retrieved from bulk storage during execution.

Input/Output or I/O devices 214 (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 3:
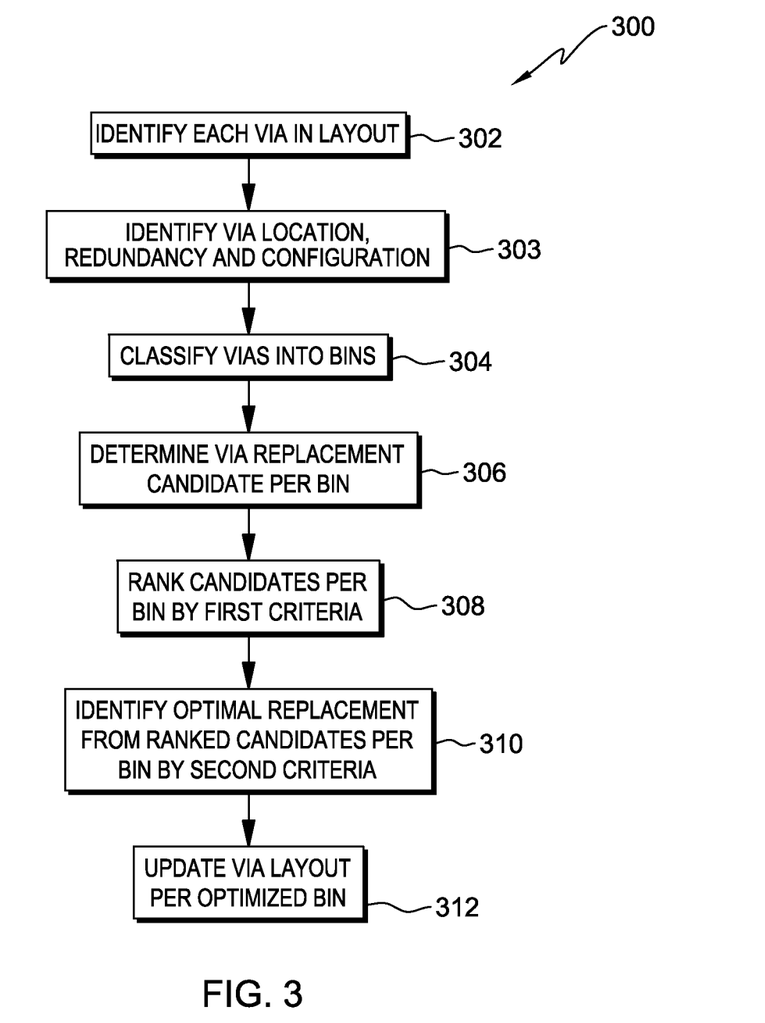
FIG. 3 is a simplified flow diagram for one example of a pattern-based method of via redundancy insertion according to one or more aspects of the present invention.

FIG. 3 is a simplified flow diagram 300 for one example of a pattern-based method of via redundancy insertion, in accordance with one or more aspects of the present invention. The method includes analyzing a via layout. In one example, the analyzing includes identifying each via in the via layout 302, and, for each via, identifying a location therefor in the layout, whether the via is redundant, and a layout configuration therefor 303. The analyzing further includes classifying the vias into a plurality of bins based on layout configuration 304. The analyzing aspect may be performed automatedly, for example, using computer analysis. As will be explained in more detail below, the layout configuration includes a "radius" around a given via, and the radius used determines a granularity for the binning; the larger the radius, the more granular the binning. Further, a typical radius will in general be smaller at a smaller technology node. For example, at a technology node of 20 nm, a typical radius may be about 200 nm, while at 14 nm, a typical radius may be about 170 nm. Returning to FIG. 3, for each bin of redundant vias, possible via replacement candidates are determined 306, and the candidates are ranked according to one or more first criteria 308. The method further includes, for each via in each bin having at least one via replacement candidate, identifying an optimal replacement from among the ranked candidates taken in ranked order that first satisfies one or more second criteria 310, and for each via in each bin with an identified optimal replacement, updating the via layout 312.

In one example, at least one of the one or more first criteria 308 is rule based. For example, the one or more first criteria could be design rule based. In another example, the at least one first criteria could include the desirability of the replacement chosen. For example, adding a double via may be preferred over increasing the via enclosure.

In another example, at least one of the one or more first criteria 308 is recommendation based. For example, the rules could be recommended rules; e.g., rules recommended by the foundry being used.

In still another example, at least one of the one or more first criteria 308 is model based. For example, lithography and process computer simulation models may be utilized to simulate the printed contour of different via shapes during the pattern transfer phase in lithography. The via candidates may be chosen, for example, based on their printability profiles.

In one example, determining possible via replacement candidates includes using lithography simulation. A number of lithography simulators could be used, also known as electronic design automation, for example, Calibre OPC/LithoSim by Mentor Graphics Inc., Wilsonville, Oreg., Tachyon by Brion Technologies Inc., Santa Clara, Calif., or Proteus by Synopsys, Mountain View, Calif.

In another example, determining possible via replacement candidates includes manually determining one or more replacement candidates.

In still another example, determining possible via replacement candidates includes searching a database of via replacements. In one example, the database is preexisting, for example, created from information accumulated over time. As one skilled in the art will know, many different database applications could be used, for example, MySQL from MySQL AB, Uppsala, Sweden.

In one example, identifying an optimal replacement from among the ranked candidates, taken in ranked order that first satisfies one or more second criteria includes an absence of a design-rule violation. In another example, the one or more second criteria includes an absence of a lithographic simulation failure. In still another example, the one or more second criteria includes considering an affect of a given ranked candidate on one or more adjacent vias.

Figure 4:
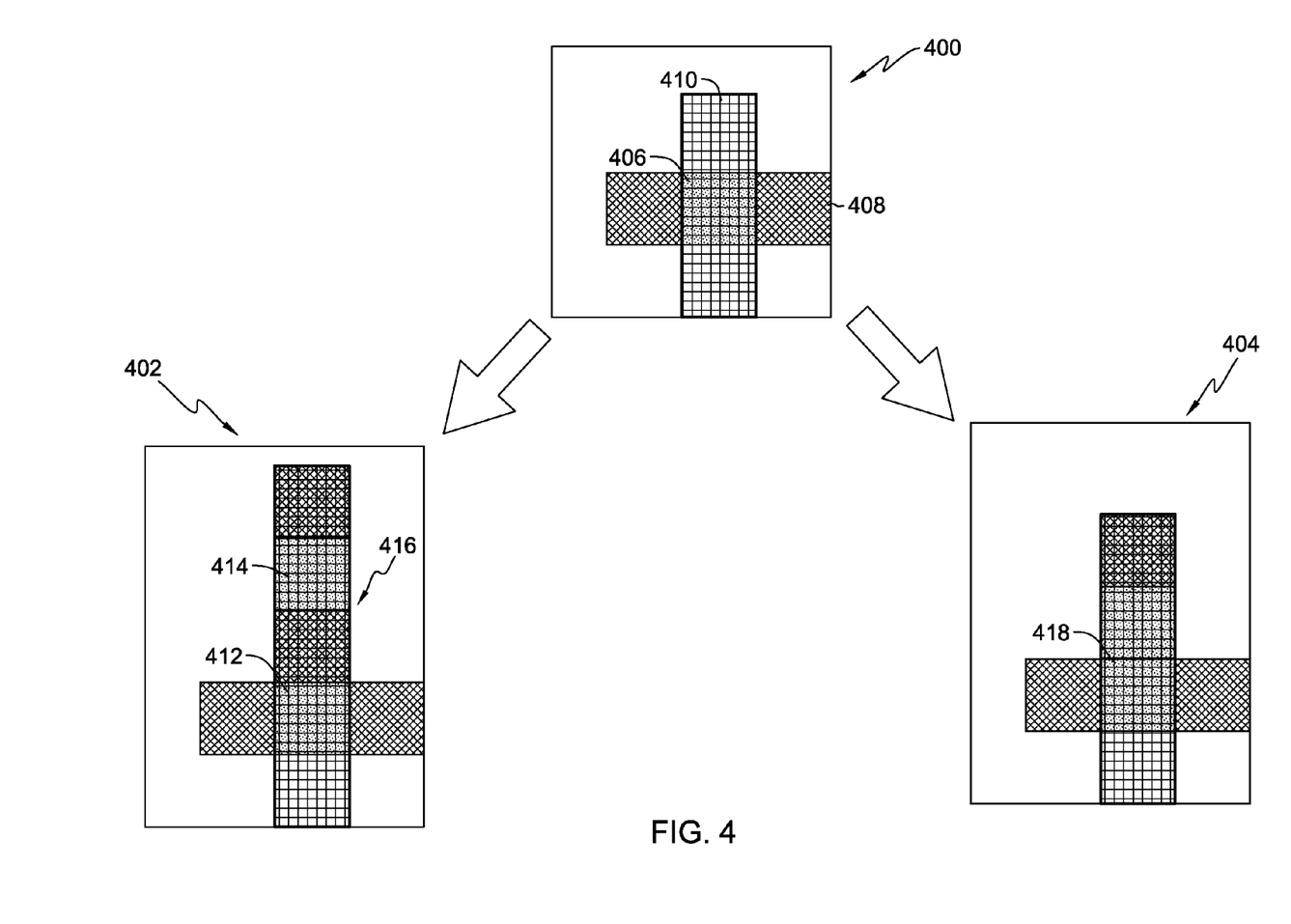
FIG. 4 depicts one example of a via area and possible via replacement candidate areas.

FIG. 4 depicts one example of a via area 400 and possible via replacement candidate areas 402, 404. Via 406 is a non-redundant, single via including bottom metal 408 and top metal 410 overlapping at via 406. It will be understood that, although depicted in FIG. 4 as perfectly square, via 406 may actually be cylindrical where, for example, silicon is the metal used. One possible replacement via, shown in area 402, is a double-cut or double-via, including primary via 412, secondary via 414 and an electrical extension 416 (not shown) underneath connecting the primary and secondary vias. Another possible replacement via is shown in area 404; a bar via or viabar 418, which is simply two vias side-by-side connected together. As can be seen from FIG. 4, redundant via replacement essentially expands the area of connection, in case there is a break in part of the connection.

The process of identifying a layout configuration for a given via includes a predetermined "radius" around the via, i.e., how far out from the via one looks at the surroundings. This radius effectively determines a granularity for the binning aspect. In other words, the smaller the radius, the fewer bins there will be, as the farther out one looks beyond the via, the more likelihood there will be of differences arising between the surroundings of two vias. In addition, as a general rule, the smaller the technology node, the smaller the radius is likely to be. For example, at 20 nm, a radius of 200 nm has been found useful, and at 14 nm, a radius of 170 nm. To put this in perspective, a typical layout can have thousands or hundreds of thousands of unique bins, depending on the radius used.

Figure 5:
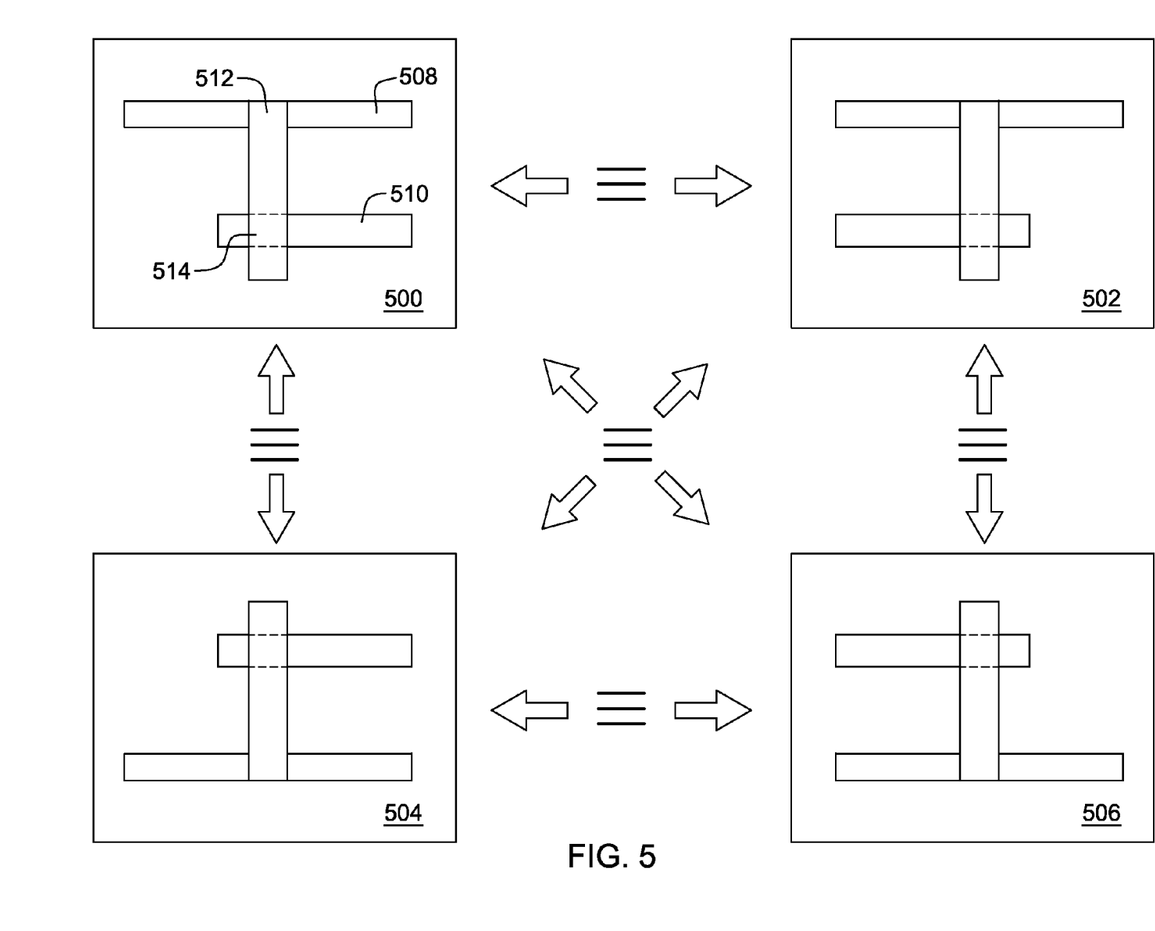
FIG. 5 depicts one example of four via layouts with equivalent configurations.

In addition to the radius, consideration is given to "equivalent" or "similar" layouts. As shown in FIG. 5, layout sections 500, 502, 504 and 506 are all considered to have a similar configuration at the radius shown. Thus, all four layout sections would be commonly binned. Each of the layouts in FIG. 5 has two bottom metal sections, one top metal section and one via. For example, layout 500 includes bottom metal sections 508 and 510, along with a top metal section 512 and via 514 where sections 510 and 512 overlap. The four layouts in FIG. 5 are essentially mirrors of each other. In the present example, the addition of any other metal section in any layout of FIG. 5 would render that layout dissimilar, and, therefore, binned separate from the layouts of FIG. 5.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method, comprising:
    analyzing a via layout, the analyzing comprising:
        identifying each via in the via layout;
        for each via, identifying: a location therefor in the layout, whether the via is redundant and a layout configuration therefor, the layout configuration being based on a predetermined area surrounding the via;
        classifying the vias into a plurality of bins based on layout configuration;
        for each bin of redundant vias, determining possible via replacement candidates, and ranking the candidates according to one or more first criteria;
        for each via in each bin having at least one via replacement candidate, identifying an optimal replacement from among the ranked candidates taken in ranked order that first satisfies one or more second criteria; and
        for each via in each bin with an identified optimal replacement, updating the via layout.

2. The method of claim 1, wherein the one or more first criteria comprises one or more of rule-based criteria, recommendation-based criteria and model-based criteria.

3. The method of claim 1, wherein the determining comprises manually determining one or more replacement candidates.

4. The method of claim 1, wherein the determining comprises searching a preexisting database of via replacements.

5. The method of claim 1, wherein identifying an optimal replacement comprises considering an affect of a given ranked candidate on one or more adjacent vias.

6. The method of claim 1, wherein the one or more second criteria comprises an absence of a design rule violation.

7. The method of claim 6, wherein the one or more second criteria comprises an absence of a lithographic simulation failure.

8. A computer system, comprising:
    a memory; and
    at least one processor in communication with the memory to perform a method, the method comprising:
        analyzing a via layout, the analyzing comprising:
            identifying each via in the via layout;
            for each via, identifying: a location therefor in the layout, whether the via is redundant and a layout configuration therefor, the layout configuration being based on a predetermined area surrounding the via;
            classifying the vias into a plurality of bins based on layout configuration;
            for each bin of redundant vias, determining possible via replacement candidates, and ranking the candidates according to one or more first criteria;
            for each via in each bin having at least one via replacement candidate, identifying an optimal replacement from among the ranked candidates taken in ranked order that first satisfies one or more second criteria; and
            for each via in each bin with an identified optimal replacement, updating the via layout.

9. The computer system of claim 8, wherein the one or more first criteria is one or more of rule-based criteria, recommendation-based criteria and model-based criteria.

10. The computer system of claim 8, wherein the determining comprises manually determining one or more replacement candidates.

11. The computer system of claim 8, wherein the determining comprises searching a preexisting database of via replacements.

12. The computer system of claim 8, wherein identifying an optimal replacement comprises considering an affect of a given ranked candidate on one or more adjacent vias.

13. The computer system of claim 8, wherein the one or more second criteria comprises an absence of a design rule violation.

14. The computer system of claim 13, wherein the one or more second criteria comprises an absence of a lithographic simulation failure.

15. A computer program product, comprising:
a storage medium readable by a processor and storing instructions for execution by the processor for performing a method, the method comprising:
analyzing a via layout, the analyzing comprising:
   identifying each via in the via layout;
   for each via, identifying: a location therefor in the layout, whether the via is redundant and a layout configuration therefor, the layout configuration being based on a predetermined area surrounding the via;
   classifying the vias into a plurality of bins based on layout configuration;
   for each bin of redundant vias, determining possible via replacement candidates, and ranking the candidates according to one or more first criteria;
   for each via in each bin having at least one via replacement candidate, identifying an optimal replacement from among the ranked candidates taken in ranked order that first satisfies one or more second criteria; and
   for each via in each bin with an identified optimal replacement, updating the via layout.

16. The computer program product of claim 15, wherein the determining comprises manually determining one or more replacement candidates.

17. The computer program product of claim 15, wherein the determining comprises searching a preexisting database of via replacements.

18. The computer program product of claim 15, wherein the one or more first criteria is one or more of rule-based criteria, recommendation-based criteria and model-based criteria.

19. The computer program product of claim 15, wherein the one or more second criteria comprises an absence of a design rule violation.

20. The computer program product of claim 17, wherein identifying an optimal replacement comprises considering an affect of a given ranked candidate on one or more adjacent vias.

* * * * *